United States Patent
Shavell et al.

(10) Patent No.: US 9,948,651 B1
(45) Date of Patent: Apr. 17, 2018

(54) AUTOMATIC SHARED PERSONAL IMAGE PRIVACY LEVEL DETECTION AND MANAGEMENT

(71) Applicant: Symantec Corporation, Mountain View, CA (US)

(72) Inventors: Michael Shavell, Merrimack, NH (US); Matthew Boucher, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 217 days.

(21) Appl. No.: 14/968,791

(22) Filed: Dec. 14, 2015

(51) Int. Cl.
G06F 21/60 (2013.01)
H04L 29/06 (2006.01)
H04L 29/08 (2006.01)

(52) U.S. Cl.
CPC ............. H04L 63/10 (2013.01); H04L 67/22 (2013.01)

(58) Field of Classification Search
CPC ................................. H04L 63/10; H04L 67/30
See application file for complete search history.

(56) References Cited

U.S. PATENT DOCUMENTS 9,294,333 B1 * 3/2016 Staddon ............... H04L 63/102
2013/0340089 A1 * 12/2013 Steinberg ............... H04L 63/10
726/27

* cited by examiner

Primary Examiner — Izunna Okeke
(74) Attorney, Agent, or Firm — Patent Law Works LLP

(57) ABSTRACT

Network traffic is monitored, and activities concerning posting images to sharing sites are detected. Detected activities can be attempts to login to sharing sites, or attempts to post images. Privacy concerns associated with sharing images on target sites are identified. In the case of detecting a successful attempt to login to a known sharing site, the site is scanned for the privacy settings in effect for the user, and it is determined whether the settings are below a given threshold. Another example of a privacy concern is detecting an attempt to post an image to an unknown site. When a privacy concern is detected, the user is warned, and prompted to indicate whether images are to be posted to the target site anyway. Attempts to post images to sites that are subject to privacy concerns are processed according to received user directives (e.g., blocked or allowed).

14 Claims, 3 Drawing Sheets

AUTOMATIC SHARED PERSONAL IMAGE PRIVACY LEVEL DETECTION AND MANAGEMENT

TECHNICAL FIELD

This disclosure pertains generally to online privacy and computer security, and more specifically to automatically preventing non-desired access of images posted to sharing sites.

BACKGROUND

Users share digital images such as photographs and videos using sharing sites such as Facebook, Instagram, Picasa, Shutterfly, Flickr, Photobucket, Pinterest and Snapfish. Many posted images are intended to be shared only with specific parties or groups. However, private photos and other personal data posted to sharing sites are subject to unintended leakage to non-authorized viewers. Sharing sites typically require privacy and other security settings to be configured by the user (e.g., user selects public or private mode for shared content). This is prone to error, as many users do not have a complete understanding of the different privacy level settings. Even those users with a higher degree of sophistication are subject to human error, especially where different privacy settings are desired for different shared content on multiple sites.

Furthermore, many users do not adjust privacy setting at all, and assume that the default settings provide adequate protection. Sharing sites, even those that encourage users to update security settings, have a vested interest in users sharing content. Therefore, the default settings do not necessarily provide the privacy level users actually desire. The same can be true of any onsite instructions directing user configuration of privacy settings.

It would be desirable to address these issues.

SUMMARY

Automatic privacy management is provided for images that users post on remote sharing sites. Network traffic on a user's computer is monitored, and network traffic activities concerning posting images to remote sharing sites are detected. The monitoring of the network traffic can take the form of hooking a browser on the computer, and monitoring activities performed by the browser. In other embodiments, network traffic can be monitored in other ways (e.g., intercepting the network protocol stack at a desired level). Detected network traffic activities of interest can be, for example, attempts to login to sharing sites, or attempts to post images. Privacy concerns associated with sharing images on target sharing sites are identified. More specifically, in the case of detecting a successful attempt to login to a known sharing site, the known sharing site is scanned for the privacy settings in effect for the user. It can then be determined whether the privacy settings in effect for the user on the site are below a given privacy threshold. If so, this would be a concern. Another example of a privacy concern would be detecting an attempt to post an image to an unknown site.

When a privacy concern associated with sharing images on a specific target site is detected, the user is warned. For example, a privacy alert documenting the specific privacy concern can be output to the user. Such a privacy alert can, for example, warn the user concerning the privacy setting in effect on the given target sharing site to which the user is logged on. Another example would be displaying a privacy alert to the user indicating that the site to which the user is attempting to upload an image is unknown. In conjunction with warning the user, the user can be prompted to indicate whether images are to be posted to the target sharing site despite the warning (e.g., whether images are to be posted to the target sharing site despite the current privacy settings that are in effect, or despite the fact that the target sharing site is unknown).

Attempts to post images to target sharing sites that are subject to privacy concerns are processed according to directives received from the user in response to the prompting. For example, attempts to post images to the target sharing site can be blocked. Such attempts can also be allowed to proceed despite the privacy concern, in response to a corresponding indication from the user to do so. In one embodiment, the user is prompted to indicate approval to update privacy settings to a more secure level when a privacy concern is detected for a sharing site. In response to receiving a corresponding indication from the user, automated interaction with the sharing site is used to update the privacy settings.

Telemetry data concerning user interaction with various sharing sites and site information concerning currently known sharing sites is maintained. Telemetry data concerning user interaction with a previously unknown sharing site can be amalgamated, and where sufficient, amalgamated telemetry data can be used to update the status of the site to known.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
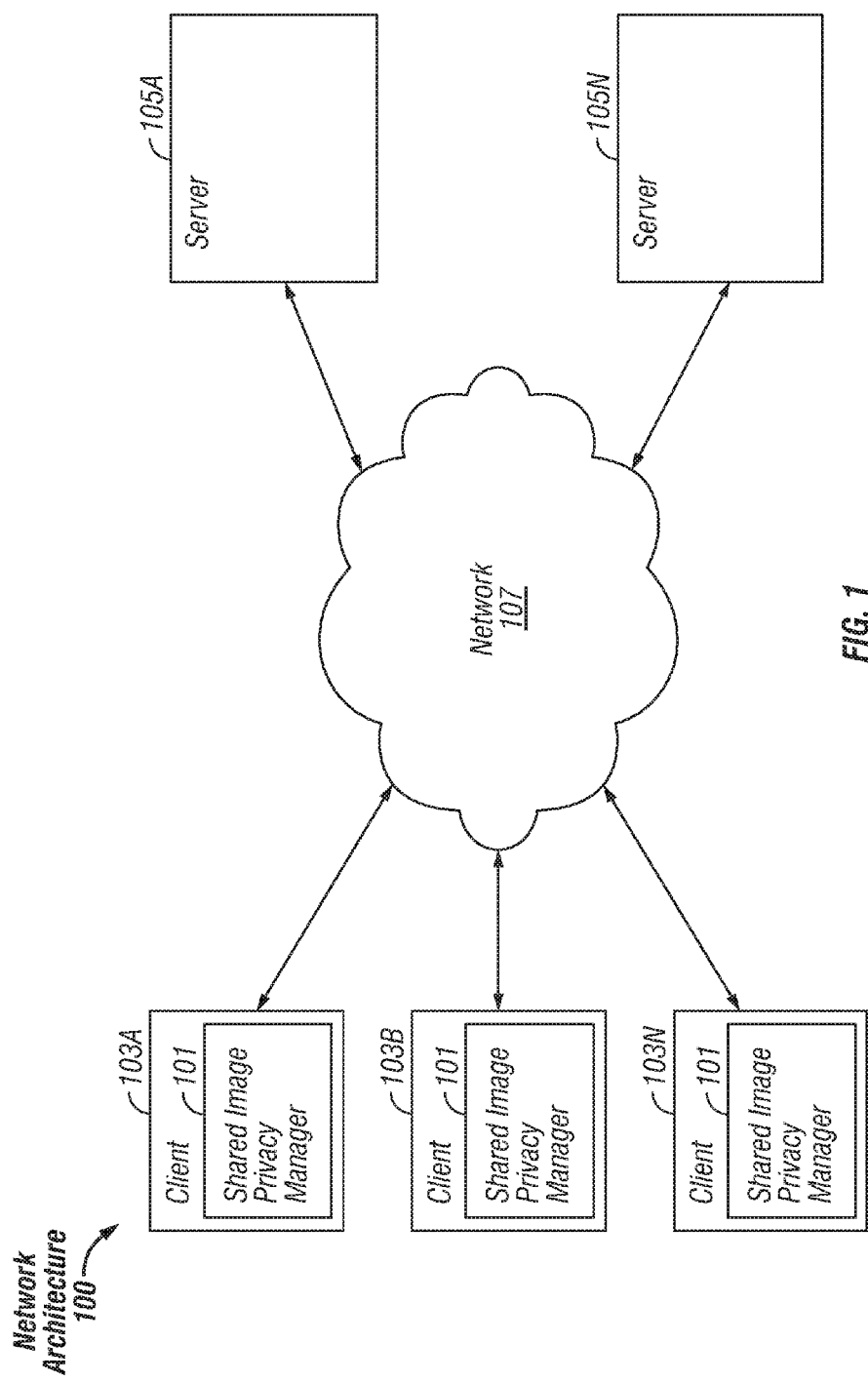
FIG. 1 is a block diagram of an exemplary network architecture in which a shared image privacy manager can be implemented, according to some embodiments.

FIG. 1 is a block diagram illustrating an exemplary network architecture 100 in which a shared image privacy manager 101 can be implemented. The illustrated network architecture 100 comprises multiple clients 103A, 103B and 103N, as well as multiple servers 105A and 105N. In FIG. 1, a shared image privacy manager 101 is illustrated as residing on each client 103A-N. It is to be understood that this is an example only, and in various embodiments various functionalities of this system 101 can be distributed between multiple computing devices 210 as desired.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser 109 or other client software (not shown). Clients 103 can but need not be in the form of mobile computing devices, comprising portable computer systems 210 capable of connecting to a network 107 and running applications. Examples of mobile computing devices are smartphones, tablets, wearable devices such as smart watches, laptop computers, etc.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
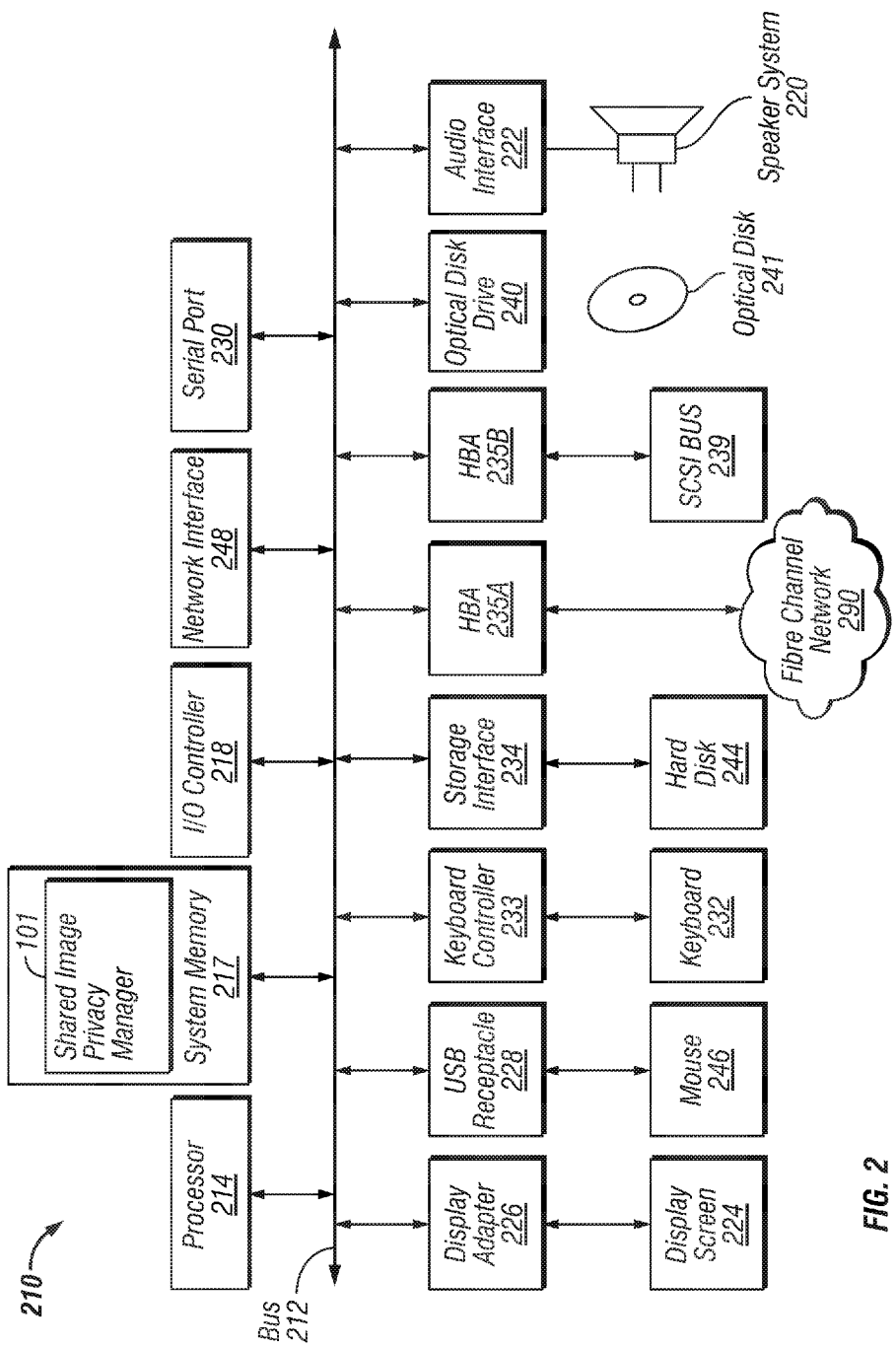
FIG. 2 is a block diagram of a computer system suitable for implementing a shared image privacy manager, according to some embodiments.

FIG. 2 is a block diagram of a computer system 210 suitable for implementing a shared image privacy manager 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 241, flash memory) and loaded into system memory 217 and executed by the processor 214. Application programs can also be loaded into system memory 217 from a remote location (i.e., a remotely located computer system 210), for example via the network interface 248. In FIG. 2, the shared image privacy manager 101 is illustrated as residing in system memory 217. The workings of the shared image privacy manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
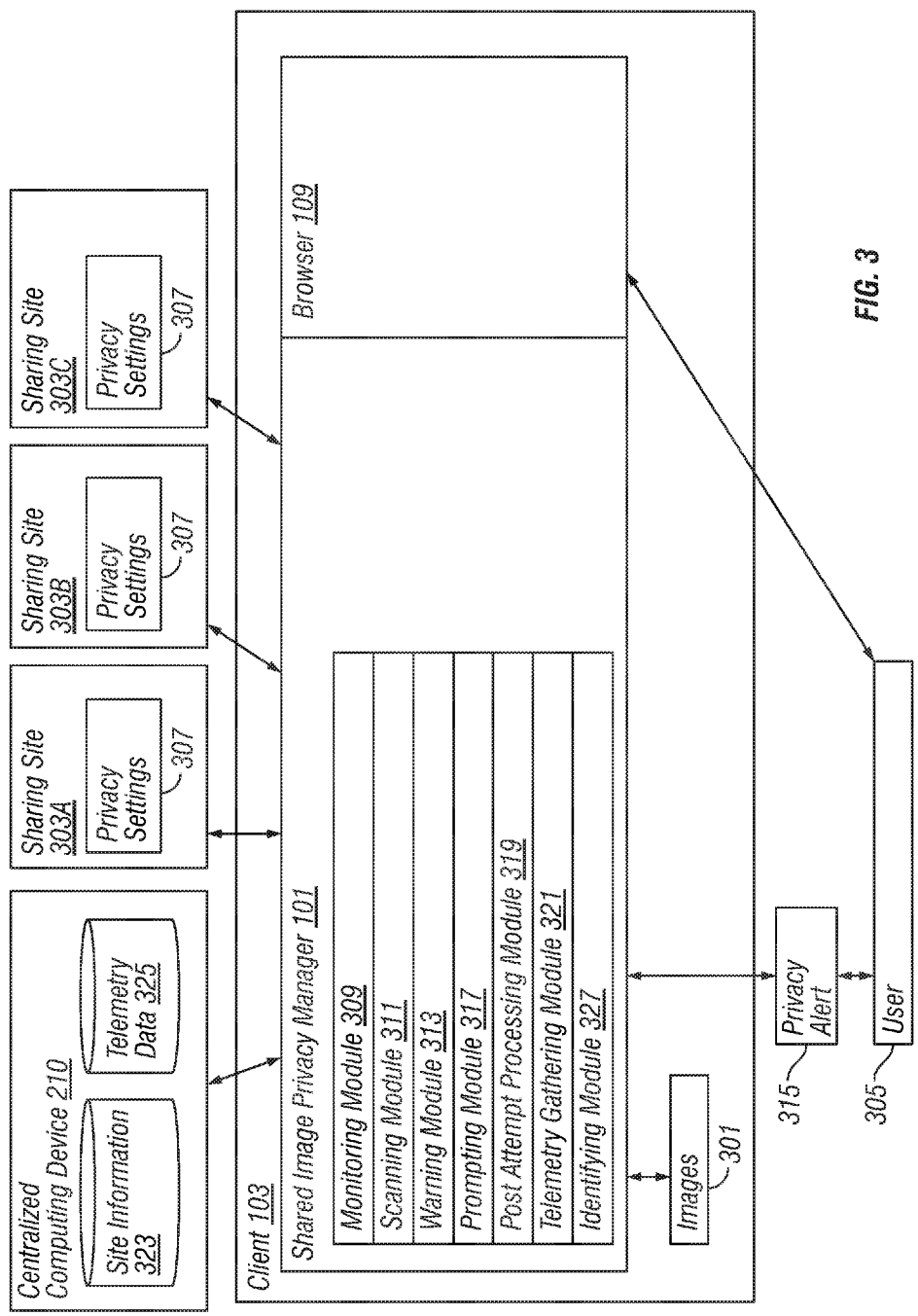
FIG. 3 is a high level block diagram of the operation of a shared image privacy manager, according to some embodiments.

FIG. 3 illustrates the operation of a shared image privacy manager 101 running on a client 103. As described above, the functionalities of the shared image privacy manager 101 can reside on specific computers 210 or be otherwise distributed between multiple computer systems 210, including within a fabric/cloud-based computing environment in which the functionality of the shared image privacy manager 101 is provided as a service over a network 107. It is to be understood that although the shared image privacy manager 101 is illustrated in FIG. 3 as a single entity, the illustrated shared image privacy manager 101 represents a collection of functionalities, which can be instantiated as a single or multiple modules as desired (instantiation of a specific, multiple module shared image privacy manager 101 is illustrated in FIG. 3). It is to be understood that the modules of the shared image privacy manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the shared image privacy manager 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

As illustrated in FIG. 3, the shared image privacy manager 101 runs on a client 103, and manages the privacy of images 301 (e.g., digital photos or videos) posted on external sharing sites 303 (e.g., web sites on which content can be shared, such as social media or other types of photo sharing sites). FIG. 3 illustrates three sharing remote sites (303A, 303B and 303N), but this is just an example, and more (or fewer) sharing sites 303 can be utilized in different embodiments. In FIG. 3, the shared image privacy manager 101 is illustrated as operating in conjunction with a browser 109. As explained in more detail below, this is an example only, and in other embodiments the shared image privacy manager 101 is configured in other ways. The client 103 can be in the form of any computing device 210 operated by a user 305, such as a desktop, laptop, tablet, smartphone, etc. In other embodiments, the functionalities of the shared image privacy manager 101 can be instantiated on one or more separate computing devices 210 (e.g., on an enterprise or cloud based server 105, a proxy, etc.) and provided to the user 305 remotely, for example as a cloud based service.

As explained in detail below, the shared image privacy manager 101 can proactively scan target sharing sites 303, and determine the relevant privacy settings 307 before the upload of any images 301. By performing such a pre-scan, the shared image privacy manager 101 is able to determine the user's privacy settings 307. Where the settings 307 do not meet a given privacy threshold, the shared image privacy manager 101 can either restrict/block posts, or warn the user 305 concerning potential content leakage.

The shared image privacy manager 101 is able to track all attempted image 301 posts. This includes posts to popular sharing sites 303, but is not limited to known destinations. Because all outbound images 301 leaving the client 103 can be detected, attempts to post images 301 on unknown sites 303 can also be managed. During the normal course of operations, the user 305 operates a browser 109 (or other client side software program) and interacts with remote sites, including sharing sites 303. As the term is used herein, a sharing site 303 means a website or other content repository on which users post digital content such as images 301 to be accessed by other parties. Social media and photo sharing sites such as Facebook, Instagram, Picasa, Shutterfly, Flickr, Photobucket, Pinterest and Snapfish are all examples of sharing sites 303, but a sharing site 303 can be something as simple as a server 105 or other computing device 210 on which one or more users 305 post content for perusal by others.

A monitoring module 309 of the shared image privacy manager 101 monitors network traffic, and detects certain activities of interest that are related to posting images 301 to sharing sites 303. Such activities can include, for example, attempts to login to known sharing sites 303 and/or attempts to post images 301 to sharing sites 303. In one embodiment the monitoring module 309 performs this functionality by hooking the browser 109 and monitoring its activities. In other embodiments, the monitoring module 309 intercepts and monitors the network communication activities of a client side program other than a browser 109. In other embodiments, network traffic is monitored at a different or lower level, for example by intercepting the network protocol stack at a desired level and monitoring traffic/transmissions accordingly.

In conjunction with the monitoring of network traffic activities and the detection of activities relating to the posting of images 301, an identifying module 327 of the shared image privacy manager 101 identifies privacy concerns associated with sharing images 301 on target sharing sites 303. The user 305 is then warned concerning such potential privacy breaches, as described in more detail below. The identification of privacy concerns associated with sharing images 301 on a given site 303 can take different forms, depending upon whether the specific site 303 in question is known to the shared image privacy manager 101. More specifically, in the case of known sharing sites 303, when the monitoring module 309 detects a successful attempt by the user 305 to login to a known site 303, a privacy setting scanning module 311 of the shared image privacy manager 101 scans the user's privacy settings 307 on the site 303. Note that at this point the user 305 has successfully logged on to the site 303, so the scanning module 311 is able to query the site 303 for the current privacy settings 307 for the user 305. As described below, the user's privacy settings 307 can be read to determine whether the current privacy level is of concern, in which case the user 305 can be notified.

As used herein, "known sharing site 303" means a specific sharing site 303 of which the shared image privacy manager 101 is aware. The shared image privacy manager 101 maintains site information 323 concerning currently known sharing sites 303, both so that logins can be identified, and privacy settings 307 can be gleaned (and in some cases updated). The specific site information 323 to maintain can vary per site 303 and per embodiment, but examples include URLs of the sites 303 and the login pages thereof, per site protocols for users 305 to obtain and modify privacy settings 307, privacy setting formats, etc. Typically, such site information 323 is maintained for current commercially available sharing sites (e.g., Facebook, Instagram, etc.). In one embodiment, site information 323 is maintained on a centralized computing device 210 (e.g., a cloud based server 105 provided by the publisher of the shared image privacy manager 101), from which it can be received or otherwise remotely accessed by specific client side shared image privacy managers 101. In one embodiment, multiple shared image privacy managers 101 installed on multiple clients 103 glean information concerning sharing sites 303 with which they interact, and transmit locally gleaned site information 323 to the centralized computing device 210. The site information 323 received from the multiple shared image privacy managers 101 can be amalgamated, and used for various purposes. For example, as described below, unknown or new sharing sites 303 can be identified and reclassified as known under certain circumstances (e.g., where a sufficient amount of corresponding site information 323 has been gleaned).

If the user's privacy setting 307 for images 301 uploaded to a specific sharing site 303 are below a given privacy threshold, a warning module 313 of the shared image privacy manager 101 can output a privacy alert 315 to the user 305 documenting the privacy concern with the target sharing site. A privacy alert 315 can be in the form of a window or other user interface component, displayed for example by the browser 109, indicating the privacy setting 307 in effect on the specific sharing site 303 to which the user 305 just logged on. For example, the privacy alert 315 could inform the user 305 that any images 301 uploaded to the site 303 will be publically viewable, viewable by friends of friends, by members of a given group, etc. The specific content and format of warning alerts 315 varies between embodiments and scenarios. For example, the level of detail and wording of any information displayed to the user 305 in a warning alert 315 can vary as desired, as can the graphical presentation.

The specific setting of the privacy threshold is a design parameter, and can vary between embodiments, target sites 303, users 305 and other factors. Typically, privacy settings 307 enabling more public levels of access of posted images 301 (e.g., full public access, access by extended groups such as friends of friends, etc.) are flagged to the user 305, whereas more private settings (e.g., access only by a group specifically designated by the posting user 305) are not. How aggressive to be when setting the threshold can be informed by factors such as user preference, empirical trustworthiness of the target site 303, etc. Privacy thresholds and determinations as to whether given privacy settings 307 do or do not meet them can be at any desired level of granularity, and different factors can be given different weights when making such determinations. For example, in one embodiment, sensitivity of the specific image 301 being posted is taken into account.

When displaying a privacy alert 315, a prompting module 317 of the shared image privacy manager 101 can prompt the user 305 to indicate whether images 301 are to be posted to the target sharing site 303 despite the warning (e.g., despite the current privacy settings 307, which were flagged as being of concern). A post attempt processing module 319 of the shared image privacy manager 101 can process attempts to post images 301 to the target sharing site 303 according to directives received from the user 305 in response to the prompting. For example, until the user 305 approves of posting to the site 303 despite the warning, the post attempt processing module 319 can block the posting of images 301 to the given sharing site 303. If the user 305 explicitly indicates approval (e.g., by selecting a correspondingly labeled user interface component or the like displayed in conjunction with the privacy alert 315), attempts to post images 301 to the given sharing set 303 are allowed to proceed despite the warning. Where the user 305 does indicate to post images 301 to the given sharing site 303 despite the warning, whether or not and how often to re-alert the user 305 concerning future attempts to post additional images 301 to the same site 303 can vary between embodiments (e.g., once user indicates approval do not re-alert user 305 about these privacy settings 307 on this sharing site 303, warn each time user 305 logs-in to this site 303, warn each time user 305 attempts to upload an image to this site 303, etc.). In one embodiment, the user 305 can be prompted to check a box or similar user interface component if s/he does not wish to see privacy alerts 315 concerning the specific privacy setting 307 on the given site 303 in the future.

In one embodiment, when a privacy alert 315 is displayed the prompting module 317 offers to update the privacy settings for the user 305 to a more private setting automatically (e.g., change from public to private or friends only, etc.). In response to receiving a corresponding indication from the user 305, the shared image privacy manager 101 can interact with the sharing site 303 to update the privacy settings 307 accordingly. In another embodiment, the shared image privacy manager 101 can display instructions to the user 305 describing how the user 305 can update the privacy settings 307.

In some instances, the monitoring module 309 detects an attempt to post an image 301 to an unknown sharing site 303 (e.g., an attempt to post an image 301 to a target address with which the shared image privacy manager 101 is not familiar). When this occurs, the warning module 313 displays a privacy alert 315 to the user 305 indicating that the user 305 is attempting to upload the given image 301 (identified by, e.g., file name) to the unknown site 303 (identified by, e.g., URL). The prompting module 317 can prompt the user 305 to indicate whether uploads of images 301 to the unknown target sharing site 303 are to proceed. Unless and until the user 305 approves, the post attempt processing module 319 can block the upload of the image 301, as described above.

A telemetry gathering module 321 of the shared image privacy manager 101 can gather telemetry data 325 concerning the user's activity concerning different shared sites 303. For example, by monitoring the sites 303 to which the user 305 attempts to post images 301, as well as the user's directives concerning blocking/permitting uploads in response to privacy alerts 315, the telemetry gathering module 321 can glean data 325 concerning user 303 behavior when posting images 301 to various sharing sites 303. In one embodiment, multiple shared image privacy managers 101 installed on multiple clients 103 transmit their gathered telemetry data 325 to the above-described centralized computing device 210. The telemetry data 325 received from the multiple shared image privacy managers 101 can be amalgamated, and mined to identify trends concerning the behaviors of users 305 on different sharing sites 303. For example, the amalgamated telemetry data 325 could indicate that users 305 of one sharing site 303 tend to post images 301 without regard to privacy, whereas users 305 of another site 303 tend to be very careful to keep all posts private. Such information could be used to set privacy thresholds for these sites 303, or to generate reports or for other purposes. For example, amalgamated telemetry data 325 can be used to gather information concerning previously unknown sharing sites 303, the status of which can be updated to known. Amalgamated telemetry data 325 can also be used to learn which sharing sites 303 are currently most used for image 301 sharing, e.g., so that extra vigilance can be extended to securing these sites 303. These are just examples of potential uses for amalgamated telemetry data 325.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for automatically managing privacy of shared images posted by a user of a computer to remote sharing sites, the method comprising:
    monitoring network traffic and detecting network traffic activities concerning posting images to remote sharing sites, by the computer;
    transmitting telemetry data concerning a user interaction with a specific target sharing site to a centralized computing device, by the computer;
    receiving a specific privacy threshold based on the transmitted telemetry data for the specific target sharing site;
    identifying a privacy concern associated with sharing images on the specific target sharing site based on the specific privacy threshold, by the computer;
    warning the user regarding the privacy concern associated with sharing images on the specific target sharing site, by the computer, wherein warning the user regarding the privacy concern associated with sharing images on the specific target sharing site further comprises warning the user concerning a privacy setting in effect on the specific target sharing, wherein the user is successfully logged on to the specific target sharing site;
    prompting the user to indicate whether images are to be posted to the specific target sharing site despite the warning, by the computer; and processing attempts to post images to the specific target sharing site according to a directive received from the user in response to the prompting, by the computer.

2. The method of claim 1 wherein monitoring network traffic and detecting network traffic activities concerning posting images to remote sharing sites further comprises:
detecting an attempt to login to a sharing site.

3. The method of claim 1 wherein monitoring network traffic and detecting network traffic activities concerning posting images to remote sharing sites further comprises:
detecting an attempt to post an image to a sharing site.

4. The method of claim 1 wherein monitoring network traffic and detecting network traffic activities concerning posting images to remote sharing sites further comprises:
hooking a browser on the computer and monitoring activities performed by the browser.

5. The method of claim 1 wherein monitoring network traffic and detecting network traffic activities concerning posting images to remote sharing sites further comprises:
intercepting a network protocol stack at a specific level.

6. The method of claim 1 wherein warning the user regarding the privacy concern associated with sharing images on the specific target sharing site further comprises:
outputting a privacy alert to the user documenting the privacy concern associated with sharing images on the specific target sharing site.

7. The method of claim 1 wherein prompting the user to indicate whether images are to be posted to the specific target sharing site despite the warning further comprises:
prompting the user to indicate whether images are to be posted to the specific target sharing site despite current privacy settings in effect for the user on the specific target sharing site.

8. The method of claim 1 wherein processing attempts to post images to the specific target sharing site according to the directive received from the user in response to the prompting further comprises:
blocking attempts to post images to the specific target sharing site.

9. The method of claim 1 processing attempts to post images to the specific target sharing site according to the directive received from the user in response to the prompting further comprises:
allowing attempts to post images to the specific target sharing site to proceed, in response to receiving an indication from the user to do so.

10. The method of claim 1 further comprising:
maintaining site information concerning currently known sharing sites.

11. The method of claim 1 further comprising:
prompting the user to indicate approval for the computer to update privacy settings for a specific sharing site automatically; and
in response to receiving a corresponding indication from the user, interacting with the specific sharing site to update the privacy settings in effect for the user, by the computer.

12. The method of claim 1 further comprising:
maintaining telemetry data concerning user interaction with a plurality of sharing sites.

13. At least one non-transitory computer readable medium for automatically managing privacy of shared images posted by a user of a computer to remote sharing sites, the at least one non-transitory computer readable medium storing computer executable instructions that, when loaded into computer memory and executed by at least one processor of at least one computing device, cause the at least one computing device to perform the following steps:
monitoring network traffic and detecting network traffic and detecting network traffic activities concerning posting images to remote sharing sites;
transmitting telemetry data concerning a user interaction with a specific target sharing site to a centralized computing device;
receiving a specific privacy threshold based on the transmitted telemetry data for the unknown site;
identifying a privacy concern associated with sharing images on the specific target sharing site the unknown site based on the specific privacy threshold;
warning the user regarding the privacy concern associated with sharing images on the specific target sharing site, wherein warning the user regarding the privacy concern associated with sharing images on the specific target sharing site further comprises warning the user concerning a privacy setting in effect on the specific target sharing, wherein the user is successfully logged on to the specific target sharing site;
prompting the user to indicate whether images are to be posted to the specific target sharing site despite the warning; and
processing attempts to post images to the specific target sharing site according to a directive received from the user in response to the prompting.

14. A computer system for automatically managing privacy of shared images posted by a user to remote sharing sites, the computer system comprising:
a processor;
system memory;
instructions in the system memory programmed to monitor network traffic and detect and detect network traffic activities concerning posting images to remote sharing sites;
instructions in the system memory programmed to transmit telemetry data concerning a user interaction with a specific target sharing site to a centralized computing device, and receive a specific privacy threshold based on the transmitted telemetry data for the unknown site;
instructions in the system memory programmed to identify a privacy concern associated with sharing images on the specific target sharing site based on the specific privacy threshold;
instructions in the system memory programmed to warn the user regarding the privacy concern associated with sharing images on the specific target sharing site, wherein warning the user regarding the privacy concern associated with sharing images on the specific target sharing site further comprises warning the user concerning a privacy setting in effect on the specific target sharing, wherein the user is successfully logged on to the specific target sharing site;
instructions in the system memory programmed to prompt the user to indicate whether images are to be posted to the specific target sharing site despite the warning; and
instructions in the system memory programmed to process attempts to post images to the specific target sharing site according to a directive received from the user in response to the prompting.

* * * * *